US005930691A

United States Patent [19]

Zeng

[11] Patent Number: 5,930,691

[45] Date of Patent: Jul. 27, 1999

[54] RADIO RECEIVER CAPABLE OF EASILY ADJUSTING A REPRODUCTION SPEED OF A SPEECH SIGNAL

[75] Inventor: Li Ping Zeng, Tokyo, Japan

[73] Assignee: NEC Corporation, Tokyo, Japan

[21] Appl. No.: 08/754,807

[22] Filed: Nov. 21, 1996

[30] Foreign Application Priority Data

Nov. 28, 1995 [JP] Japan .................................... 7-309617

[51] Int. Cl.[6] ........................................ H04B 1/16

[52] U.S. Cl. .................. 455/186.1; 455/412; 340/825.44

[58] Field of Search ................................ 455/186.1, 412, 455/413, 575, 38.1, 228; 340/825.44; 369/7, 27, 28, 30

[56] References Cited

U.S. PATENT DOCUMENTS

| | | | |
|---|---|---|---|
| 4,769,642 | 9/1988 | Davis et al. | 340/825.44 |
| 4,821,021 | 4/1989 | Ide et al. | 340/825.44 |
| 4,873,520 | 10/1989 | Fisch et al. | 340/825.44 |
| 4,905,003 | 2/1990 | Helferich | 455/412 |
| 5,153,579 | 10/1992 | Fisch et al. | 340/825.22 |

FOREIGN PATENT DOCUMENTS

| | | |
|---|---|---|
| 0529729 | 8/1992 | European Pat. Off. . |
| 58-88934 | 5/1983 | Japan . |
| 9102433 | 2/1991 | WIPO . |

*Primary Examiner*—Edward F. Urban

*Attorney, Agent, or Firm*—Sughrue, Mion, Zinn, Macpeak & Seas, PLLC

[57] ABSTRACT

A radio receiver is for receiving a transmitted signal having a message signal as a received signal to reproduce the message signal into a speech signal. The radio receiver comprises a message memory section (3) for memorizing the message signal as a memorized message signal. A reading section (5, 14, 16) reads the memorized message signal as a read-out message signal out of the message memory section in response to a reproduction command to reproduce the read-out message signal into the speech signal in accordance with a reproduction speed. A counter circuit (9) counts the reproduction command to produce a count signal representative of a count. A speed controller (10) varies the reproduction speed into a varied reproduction speed in accordance with the count signal. The speed controller controls the reading section to make the reading section reproduce the read-out message signal into the speech signal on the basis of the varied reproduction speed.

8 Claims, 4 Drawing Sheets

RADIO RECEIVER CAPABLE OF EASILY ADJUSTING A REPRODUCTION SPEED OF A SPEECH SIGNAL

BACKGROUND OF THE INVENTION

This invention relates to a radio receiver for receiving a transmitted signal having a message signal as a received signal to reproduce the message signal into a speech signal.

In general, it is known that a radio receiver such as a radio paging receiver receives a transmitted signal having a message signal as a received signal to reproduce the message signal into a speech signal. The radio receiver comprises a memory section for memorizing the message signal as a memorized message signal. On reproducing the message signal into the speech signal, a user puts a reproduction switch into operation. In response to a switch operation, a control section reads the memorized message signal as a read-out message signal out of the memory section.

Supplied with the read-out message signal, a reproducing section reproduces the read-out message signal into the speech signal on the basis of a predetermined reproduction speed. The speech signal is outputted as a speech from a loudspeaker. When the reproducing switch is again put into operation, the reproducing section reproduces the read-out message signal into the speech signal on the basis of the predetermined reproduction speed.

Inasmuch as the predetermined reproduction speed is a constant speed, the user may not catch the speech when the predetermined reproduction speed is a high speed. In case where the predetermined reproduction speed is the high speed, the user may not catch the speech even if the reproduction switch is again put into operation.

In order to easily catch the speech from the loudspeaker, an improved radio receiver is disclosed in a Japanese Patent Publication Tokkai Syo 58-88934 (88934/1983). In the improved radio receiver, it is possible for the user to vary the predetermined reproduction speed by a manual operation switch such as a volume switch.

However, the user must operate the manual operation switch to adjust the predetermined reproduction speed, every time when the reproducing switch is again put into operation. It is difficult to adjust the predetermined reproduction speed in the improved radio receiver.

Furthermore, the radio paging receiver is generally of a small size. Therefore, the manual operation switch becomes very small size since the radio paging receiver is of the small size. In case where the manual operation switch is the volume switch, it is difficult for the user to operate the manual operation switch inasmuch as the manual operation switch is of very small size.

SUMMARY OF THE INVENTION

It is an object of this invention to provide a radio receiver capable of easily adjusting a reproduction speed of a speech signal.

Other objects of this invention will become clear as the description proceeds.

On describing the gist of this invention, it is possible to understand that a radio receiver is for receiving a transmitted signal having a message signal as a received signal to reproduce a speech signal on the basis of the message signal.

According to this invention, the radio receiver comprises message memory means for memorizing the message signal as a memorized message signal, reading means for reading the memorized message signal as a read-out message signal out of the message memory means in accordance with a reproduction command to reproduce the read-out message signal into the speech signal on the basis of a reproduction speed, counting means for counting the reproduction command to produce a count signal having a count, and varying means for varying the reproduction speed in accordance with the count signal.

DESCRIPTION OF THE PREFERRED EMBODIMENT

Figure 1:
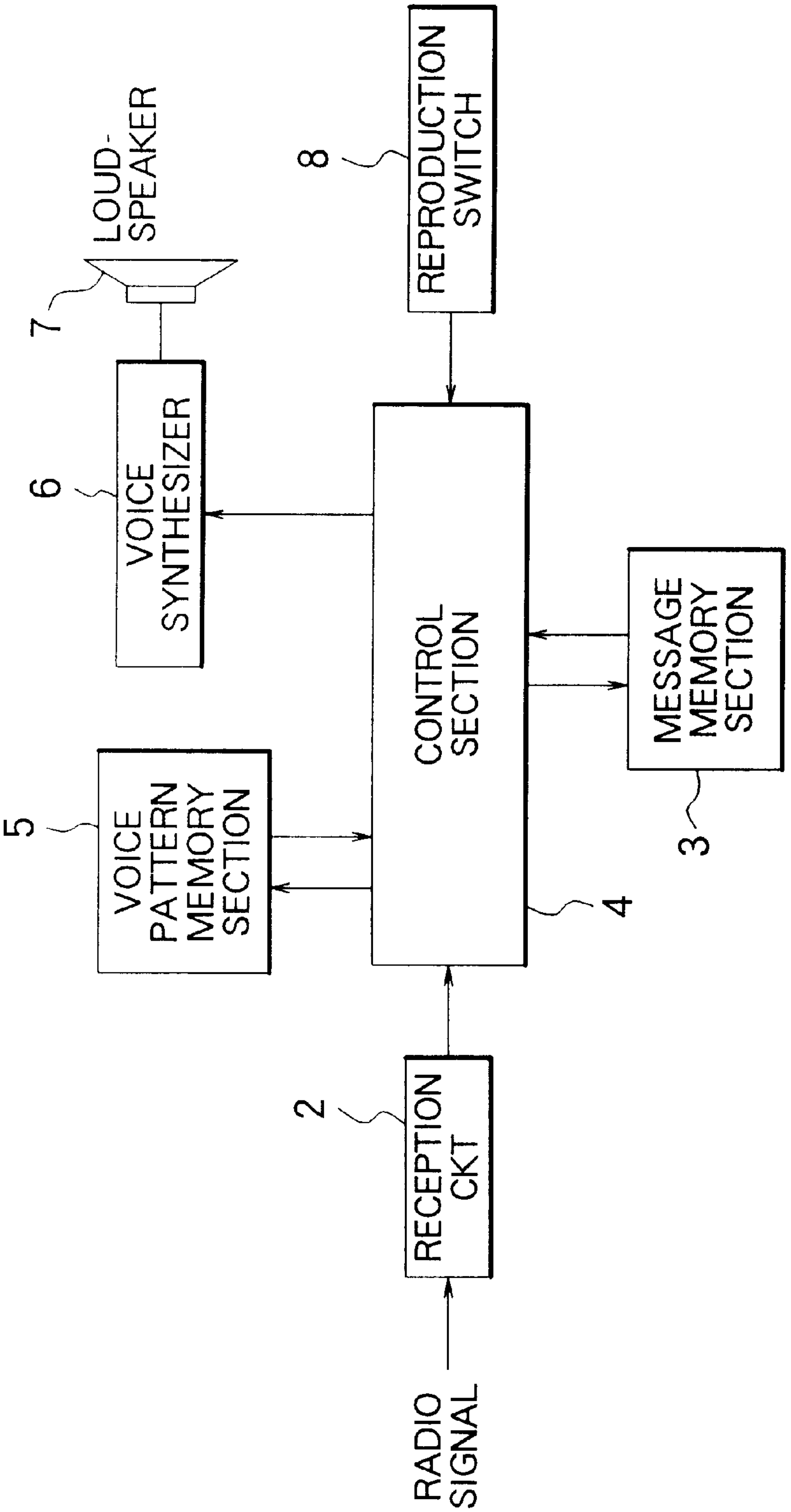
FIG. 1 PRIOR ART
FIG. 1 is a block diagram of a conventional radio paging receiver.

Referring to FIG. 1, a description will be made in regards to conventional radio receiver for a better understanding of this invention. In the example being illustrated, the radio receiver may be used as a radio paging receiver 20 which is for receiving a specific one of a plurality of call signals that is specific to the radio paging receiver. Each of the call signals may be succeeded by a message signal indicative of a message. The call signals and the message signals are transmitted as a radio signal from a transmitting station (not shown).

The radio paging receiver 20 comprises a reception circuit 2, a message memory section 3, a control section 4, a voice pattern memory section 5, a voice synthesizer 6, a loud speaker 7, and a reproduction switch 8.

The reception circuit 2 is intermittently put into operation for receiving the radio signal to demodulate the radio signal into a demodulated signal. The control section 4 is supplied with the demodulated signal to distinguish one of the call signals as specific to the radio paging receiver When the control section 4 distinguishes the specific call signal from the call signals, the control section 4 sends a tone signal to an announcement section such as a buzzer (not shown) to make the announcement section generate a call tone indicative of a call for the radio paging receiver 20.

When the specific call signal is succeeded by a specific message signal, the control section 4 receives the specific message signal succeeding the specific call signal to memorize the specific message signal as a memorized message signal in the message memory section 3. Furthermore, the control section 4 accesses the voice pattern memory section 5 in accordance with the specific message signal to read a voice pattern out of the voice pattern memory section 5. The voice pattern is supplied from the control section 4 to the voice synthesizer 6.

Supplied with the voice pattern, the voice synthesizer 6 reproduces a speech or voice signal from the voice pattern on the basis of a reproduction speed. The speech signal is outputted as a speech or voice from the loudspeaker 7.

When a user again wants to reproduce the specific message signal into the speech signal, the user puts the reproduction switch 8 into operation. More specifically, the user may put the reproduction switch 8 into operation if the user hardly catches the speech from the loudspeaker 7.

When the reproduction switch 8 is put into operation, the reproduction switch 8 supplies a reproduction command to the control section 4. Responsive to the reproduction command, the control section 4 reads the memorized message signal as a read-out message signal out of the memory section 3. The control section 4 accesses the voice pattern memory section 5 in accordance with the read-out message signal to read the voice pattern out of the voice pattern memory section 5. The voice pattern is supplied from the control section 4 to the voice synthesizer 6.

The voice synthesizer 6 reproduces the voice pattern into the speech signal on the basis of the reproduction speed. The speech signal is outputted as the speech from the loudspeaker 7.

As described above, the voice synthesizer 6 reproduces the specific message signal into the speech signal in cooperation with the control section 4 on the basis of the reproduction speed which may be a constant speed. When the reproduction speed is a high speed, the user may not catch the speech from the loudspeaker 7 even though the user again puts the reproduction switch 8 into operation.

Figure 2:
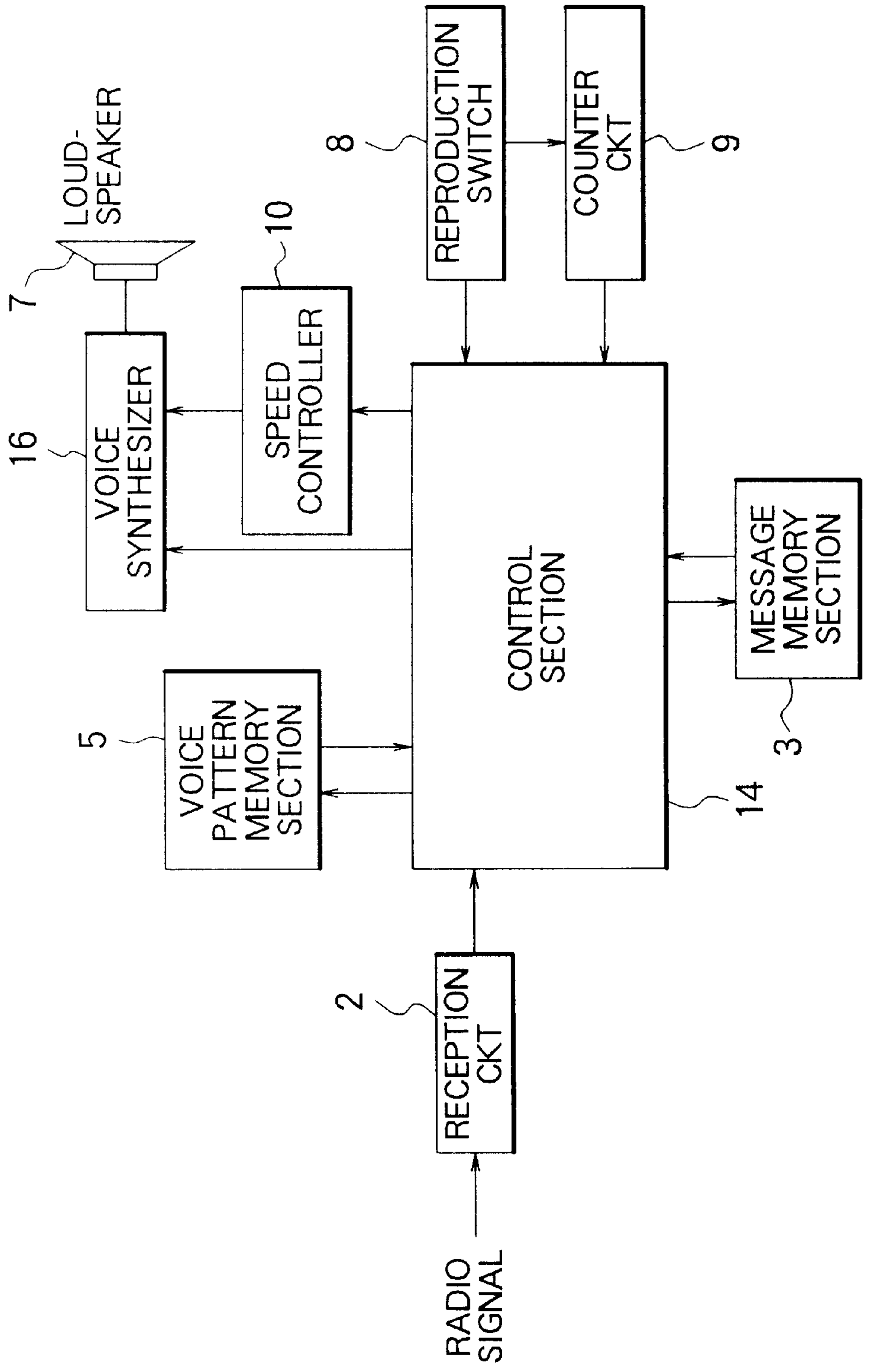
FIG. 2 is a block diagram of a radio paging receiver according to a preferred embodiment of this invention.

Referring to FIG. 2, description will proceed to describe a radio receiver according to a preferred embodiment of this invention. In the example being illustrated, the radio receiver may be used as a radio paging receiver 21 which is different in structure from the radio paging receiver 20 illustrated in FIG. 1.

The radio paging receiver 21 comprises similar parts which are designated by like reference numerals and operable with likewise named signals. The radio paging receiver 21 comprises a control section and a voice synthesizer which are different in function from the control section 4 and the voice synthesizer 6 illustrated in FIG. 1, respectively. Therefore, the control section and the voice synthesizer of the radio paging receiver 21 are designated by reference numerals 14 and 16, respectively. The radio paging receiver 21 further comprises a counter circuit 9 and a speed controller 10.

As described in conjunction with FIG. 1, the reception circuit 2 is intermittently put into operation for receiving the radio signal to demodulate the radio signal into the demodulated signal. The control section 14 is supplied with the demodulated signal to distinguish a specific one of the call signals specific to the radio paging receiver 21.

When the control section 14 distinguishes the specific call signal from the call signals, the control section 14 sends the tone signal to the announcement section to make the announcement section generate the call tone indicative of the call for the radio paging receiver 21.

When the specific call signal is succeeded by a specific message signal, the control section 14 receives the specific message signal succeeding the specific call signal to memorize the specific message signal as a memorized message signal in the message memory section 3. Furthermore, the control section 14 accesses the voice pattern memory section 5 in accordance with the specific message signal to read a voice pattern out of the voice pattern memory section 5. The voice pattern is supplied from the control section 14 to the voice synthesizer 16.

Supplied with the voice pattern, the voice synthesizer 16 reproduces a speech or voice signal from the voice pattern on the basis of a basic reproduction speed. The speech signal is outputted as a reproduced speech or voice from the loudspeaker 7.

Figure 3:
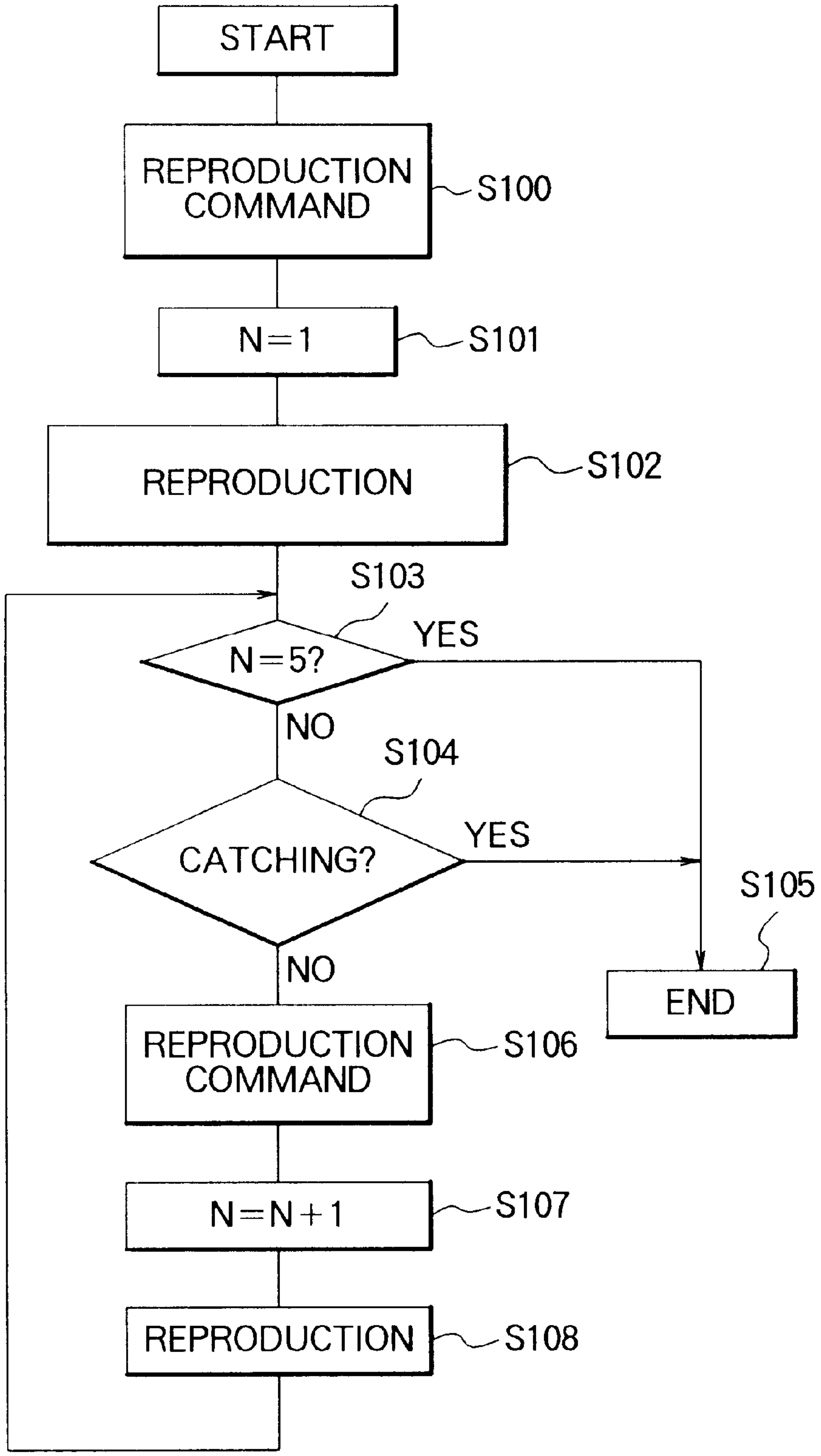
FIG. 3 is a flow chart for describing an example of operation of the radio paging receiver illustrated in FIG. 2.

Referring to FIG. 3 together with FIG. 2, the user pushes the reproduction switch 8 when the user again wants to reproduce the memorized message signal into the speech signal. More specifically, the user may push the reproduction switch 8 when the user hardly catches the speech from the loudspeaker 7. When the user pushes the reproduction switch 8, the reproduction switch 8 supplies a reproduction command to the counter circuit 9 and the control section 14 at a first step S100 labelled "REPRODUCTION COMMAND".

Responsive to the reproduction command, the counter circuit 9 counts the reproduction command to produce a count signal representative of a count N, where N represents a positive integer less than one. In the example being illustrated, the counter 9 makes the count N be equal to 1 in accordance with the reproduction command at a second step S101 and supplies the control section 14 with a first count signal representative of a one count.

Supplied with the reproduction command, the control section 14 reads the memorized message signal as the read-out memorized signal out of the message memory section 3. Furthermore, the control section 14 accesses the voice pattern memory section 5 in accordance with the read-out message signal to read the voice pattern out of the voice pattern memory section 5. The voice pattern is supplied from the control section 14 to the voice synthesizer 16.

Supplied with the first count signal, the control section 14 produces a first speed signal representative of a first reproduction speed which is less than the basic reproduction speed. The first speed signal is set into the speed controller 10. The speed controller 10 controls the voice synthesizer 16 to make the voice synthesizer 16 reproduce the voice pattern into the speech signal on the basis of the first reproduction speed at a third step S103 labelled "REPRODUCTION". The speech signal having the first reproduction speed is supplied to the loudspeaker 7 to be outputted as the reproduced speech from the loudspeaker 7.

More particularly, the control section 14 accesses the voice pattern memory section 5 in accordance with the read-out message signal to supply the voice pattern as an address signal to the voice synthesizer 16. The voice synthesizer 16 reproduces the speech signal in accordance with the address signal. In the example being illustrated, the voice synthesizer 16 outputs the speech signal representative of "zero" when the address signal is representative of "00". When the address signal is representative of "20", the voice synthesizer 16 outputs the speech signal representative of "urgency".

After production of the voice pattern, the control section 14 judges whether or not the count N reaches to a predetermined count at a fourth step S103. In the example being illustrated, the predetermined count is equal to five. When the the count N does not reach to the predetermined count, the fourth step S103 is followed by a fifth step S104 at which operation is carried out to judge whether or not the reproduced speech is caught by the user. More specifically, the control section 14 judges that the reproduced speech is caught by the user at the fifth step S104 labelled "CATCHING" when the reproduction command is not again supplied to the control section 14 during a predetermined time duration.

When the reproduced speech is caught by the user, the control section 14 ends a reproduction operation at a sixth step S105 labelled "END". Namely, the fifth step S104 is followed by the sixth step S105 when the reproduction command is not again supplied to the control section 14 during the predetermined time duration.

When the reproduced speech is not caught by the user, the fifth step S104 is followed by a seventh step S106 labelled "REPRODUCTION COMMAND". Namely, the user again pushes the reproduction switch 8 at the seventh step S106 when the user can not catch the reproduced speech. When the user again pushes the reproduction switch 8, the reproduction switch 8 again supplies the reproduction command to the counter circuit 9 and the control section 14.

Responsive to the reproduction command, the counter circuit 9 makes the count N become equal to 2 at an eighth step S107 and supplies the control section 14 with a second count signal representative of a two count.

As described above, the control section 14 reads the memorized message signal as the read-out memorized signal out of the message memory section 3 in response to the reproduction command. Furthermore, the control section 14 accesses the voice pattern memory section 5 in accordance with the read-out message signal to read the voice pattern out of the voice pattern memory section 5. The voice pattern is supplied from the control section 14 to the voice synthesizer 16.

Supplied with the second count signal, the control section 14 produces a second speed signal representative of a second reproduction speed which is less than the first reproduction speed. The second speed signal is set into the speed controller 10. The speed controller 10 controls the voice synthesizer 16 to make the voice synthesizer 16 reproduce the voice pattern into the speech signal on the basis of the second reproduction speed at a ninth step S108 labelled "REPRODUCTION". The speech signal having the second reproduction speed is supplied to the loudspeaker 7 to be outputted as the reproduced speech from the loudspeaker 7. The ninth step S108 is followed by the fourth step S103 in order to judge whether or not the count N reaches the predetermined count. The fourth step S103 is followed by the sixth step S105 when the count N reaches the predetermined count which may be equal to, for example, five.

As readily understood from the above description, the control section 14 produces an N-th speed signal representative of an N-th reproduction speed when an N-th reproduction command is supplied from the reproduction switch 8 to the control section 14. The N-th reproduction speed is less than an (N−1)-th reproduction speed.

Figure 4:
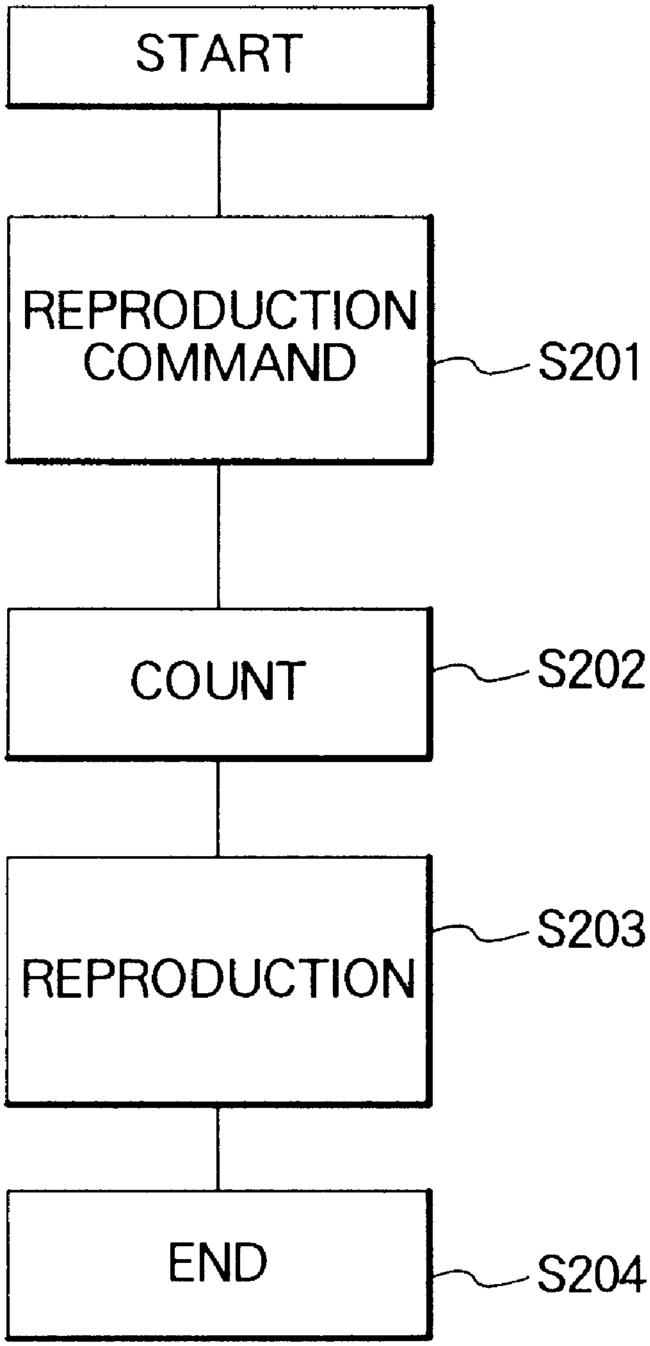
FIG. 4 is a flow chart for describing another example of operation of the radio paging receiver illustrated in FIG. 2.

Referring to FIG. 4 together with FIG. 2, description will proceed to another example of operation of the radio paging receiver 21. As described in conjunction with FIG. 3, the user pushes the reproduction switch 8 when the user hardly catches speech from the loudspeaker 7. The user may want to reproduce the memorized message signal into the speech signal at a very low reproduction speed. In this event, it is necessary for the user to successively push the reproduction switch 8 at several times.

In the example being illustrated, it is assumed that the user successively pushes the reproduction switch 8 twice. The reproduction switch 8 successively supplies the reproduction command to the control section 14 and the counter circuit 9 at a first step S201 labelled "REPRODUCTION COMMAND". When the reproduction switch 8 is pushed twice, the counter circuit 9 makes the count N be equal to two to produce the second count signal representative of the two count at a second step S202 labelled "COUNT".

Responsive to the reproduction command, the control section supplies the voice pattern to the voice synthesizer 16 as described in conjunction with FIG. 3. Furthermore, the control section 14 produces the second speed signal in response to the second count signal. The second count signal is set into the speed controller 10.

The speed controller 10 controls the voice synthesizer 16 to make the voice synthesizer 16 reproduce the voice pattern into the speech signal on the basis of the second reproduction speed at a third step S203 labelled "REPRODUCTION". The speech signal having the second reproduction speed is supplied to the loudspeaker 7 to be outputted as the reproduced speech from the loudspeaker 7. The third step S203 is followed by a fourth step S204 at which operation ends.

When the user successively pushes the reproduction switch 8 at three times, the counter 9 makes the count N be equal to three to produce a third count signal representative of a three count at the second step S202. The third reproduction speed is less than the second reproduction speed. As a result, the speed controller 10 controls the voice synthesizer 16 to make the voice synthesizer 16 reproduce the voice pattern into the speech signal on the basis of the third reproduction speed at the third step S203.

While this invention has thus far been described in conjunction with the preferred embodiment thereof, it will readily be possible for those skilled in the art to put this invention into practice in various other manners.

What is claimed is:

1. A radio receiver for receiving a transmitted signal having a message signal as a received signal to produce a speech signal on the basis of said message signal, said radio receiver comprising:

message memory means for memorizing said message signal as memorized message signal;

reading means for reading said memorized message signal as a read-out message signal out of said message memory means in accordance with a reproduction command to reproduce said read-out message signal into said speech signal on the basis of an output reproduction speed;

counting means for counting said reproduction command to produce a count signal representative of the number of reproduction commands entered;

varying means for varying said output reproduction speed in accordance with said count signal; and control means for repeating said memorized message signal in accordance with a predetermined interval between said reproduction commands.

2. A radio receiver as claimed in claim 1, wherein said radio receiver further comprises command supplying means for supplying said reproduction command to said reading means.

3. A radio receiver as claimed in claim 2, wherein said command supplying means is a switch which is operated by a user.

4. A radio receiver as claimed in claim 1, wherein said reading means comprises:

accessing means responsive to said reproduction command for accessing said message memory means to read said memorized message signal as said read-out message signal out of said message memory means; and reproducing means for reproducing said read-out message signal into said speech signal on the basis of said output reproduction speed.

5. A radio receiver as claimed in claim 4, wherein said varying means controls said reproducing means in accordance with said count signal to make said reproducing means reproduce said read-out message signal into said speech signal.

6. A radio receiver as claimed in claim 1, wherein said radio receiver further comprises a loudspeaker supplied to said speech signal for outputting said speech signal as a speech.

7. A radio receiver as claimed in claim 1, wherein said varying means reduces said output reproduction speed as said count signal increases.

8. A radio paging receiver comprising receiving means for receiving a plurality of call signals and a plurality of message signals succeeding said call signals, respectively, distinguishing means connected to said receiving means for distinguishing a specific one of said call signals specific to said radio paging receiver to receive a specific message signal succeeding said specific call signal among said message signals, and processing means for processing said specific message signal into a speech signal, wherein said processing means comprises:

message memory means for memorizing said specific message signal as a memorized message signal;

accessing means for accessing said message memory means in accordance with a reproduction command to read said memorized message signal as a read-out message signal out of said message memory means;

reproducing means for reproducing said read-out message signal into said speech signal on the basis of an output reproduction speed;

counting means for counting said reproduction command to produce a count signal representative of the number of reproduction commands entered; and varying means for varying said output reproduction speed in accordance with said count signal; and control means for repeating said memorized message signal in accordance with a predetermined interval between said reproduction commands.

* * * * *